US006385185B1

(12) United States Patent
Huang (10) Patent No.: US 6,385,185 B1
(45) Date of Patent: May 7, 2002

(54) METHODS AND APPARATUS FOR COHERENT DETECTION OF SIGNALS WITH ORTHOGONAL DATA MODULATION

(75) Inventor: Howard C. Huang, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/104,791

(22) Filed: Jun. 25, 1998

(51) Int. Cl.[7] .............................................. H04B 7/216
(52) U.S. Cl. ....................................................... 370/342
(58) Field of Search .................................. 370/342, 441, 370/442, 343, 500, 527, 203, 204, 206, 208, 209, 211, 320, 334, 339; 375/130, 260, 269, 270, 285, 268, 142, 143, 144, 145, 150, 152, 153

(56) References Cited

U.S. PATENT DOCUMENTS 5,506,861 A * 4/1996 Bottomley .................. 375/334
5,757,845 A * 5/1998 Fukaka et al. .............. 370/342
5,757,854 A * 5/1998 Hunsinger et al. .......... 370/527

OTHER PUBLICATIONS

A.F. Naguib and A. Paulraj, "Performance of Wireless CDMA with M–ary Orthogonal Data Modulation and Cell Site Antenna Arrays," IEEE Journal on Selected Areas in Communications, vol. 14, No. 9, pp. 1770–1783, Dec. 1996.

L.M.A. Jalloul and J.M. Holtzman, "Performance Analysis of DS/CDMA with Noncoherent M–ary Orthogonal Modulation in Multipath Fading Channels," IEEE Journal on Selected Areas in Communications, vol. 12, No. 5, pp. 862–870, Jun. 1994.

Andrew J. Viterbi, "CDMA: Principles of Spread Spectrum Communication," Addison–Wesley, Reading, MA, pp. 96–109, 1995.

* cited by examiner

Primary Examiner—Dang Ton
(74) Attorney, Agent, or Firm—Joseph B. Ryan; Ryan & Mason & Lewis, LLP (57) ABSTRACT

Coherent channels estimates are generated for received uplink mobile-to-base signals in a wireless CDMA system, or for other types of orthogonally-modulated signals in other multiaccess systems. The coherent channel estimates are used to implement signal detection functions such as maximal ratio combining (MRC), coherent detection and interference cancellation. In one embodiment, a matched filter bank provides a set of matched filter outputs for different combinations of data symbols, multipath components of a received signal, and base station receive antennas. The matched filter outputs are processed in a coherent channel estimator to generate a set of coherent channel estimates. The channel estimates may be generated directly from the matched filter outputs, or may be generated by processing the matched filter outputs using a decorrelating detector approach. The invention also provides improved interference cancellation techniques which can be implemented using any type of coherent channel estimates.

23 Claims, 5 Drawing Sheets

METHODS AND APPARATUS FOR COHERENT DETECTION OF SIGNALS WITH ORTHOGONAL DATA MODULATION

FIELD OF THE INVENTION

The present invention relates generally to Code-Division Multiple Access (CDMA) communication systems and other types of multiaccess systems which utilize orthogonal data modulation, and more particularly to signal detection techniques for use in such systems.

BACKGROUND OF THE INVENTION

The IS-95 CDMA standard specifies techniques for implementing cellular and PCS-band mobile wireless communications. Designed for handling voice calls, IS-95 systems provide a significant capacity increase over previous wireless systems. A conventional base station detector configured in accordance with the IS-95 standard uses a combination of selection diversity (SD) for choosing the strongest signal among the signals of several receive antennas and equal gain combining (EGC) for summing the energies of these signals. The conventional base station detector also uses noncoherent energy detection for deciding among the available orthogonally-modulated CDMA signals for each user. Additional details regarding IS-95 systems can be found in, for example, TIA/EIA/IS-95A, "Mobile Station-Base Station Compatibility Standard for Dual-Mode Wideband Spread Spectrum Cellular System," June 1996, which is incorporated by reference herein.

Figure 1:
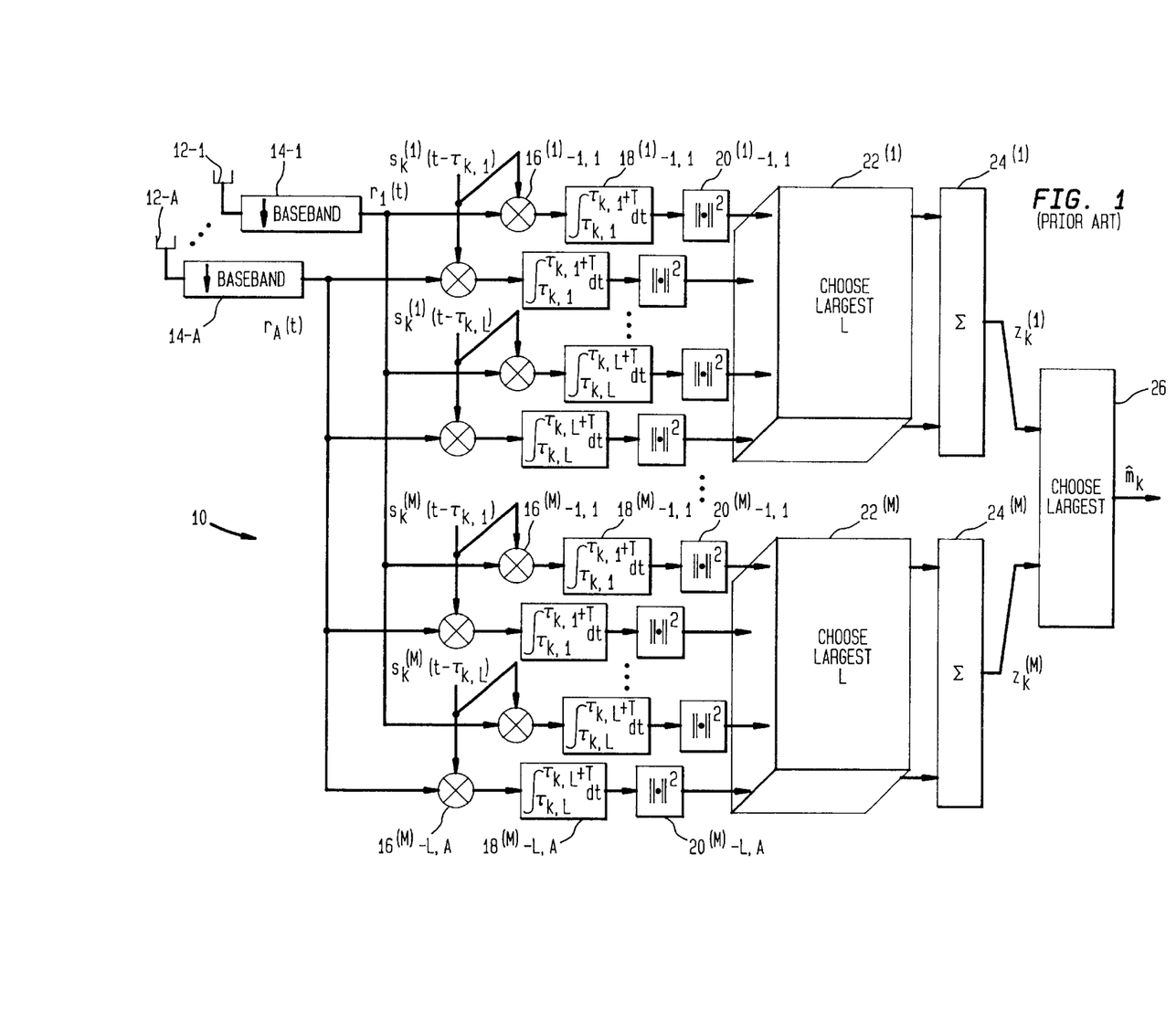
FIG. 1 is a block diagram of a conventional noncoherent CDMA signal detector.

FIG. 1 shows a conventional IS-95 noncoherent base station detector 10 for detecting an uplink orthogonally-modulated CDMA signal transmitted by a kth user. The detector 10 includes A receive antennas 12-a, a=1, 2, ... A. Each of the antennas 12-a is coupled to a corresponding downconverter 14-a. The downconverted baseband received signal from the ath antenna is designated $r_a(t)$. Assuming that the multipath delays are known perfectly, for a given resolvable multipath component with a given delay, the received signal at the ath antenna is correlated with M data signals $s_k^{(m)}(t-\tau_{k,l})$, where a specifies one of the A antennas, l=1, 2, ... L specifies one of the multipath components of the kth user, and m=1, 2, ... M specifies one of M possible data symbols. Each correlator in the detector 10 includes a multiplier $16^{(m)}$-l, a, a matched filter $18^{(m)}$-l, a and a squaring device $20^{(m)}$-l, a. The detector 10 uses selection diversity of order L (i.e., SD(L)) among the multiple receive antennas to pick out the strongest L signals for further processing. This selection process is implemented in selection devices $22^{(1)}, 22^{(2)}, \ldots 22^{(M)}$. The outputs of each of the selection devices $22^{(m)}$ are summed in a corresponding summing device $24^{(m)}$. For each of the M data symbols, the resulting largest L correlator outputs as determined by selection device $22^{(m)}$ are combined using equal gain combining (i.e., EGC(L)) in summing devices $24^{(m)}$ to form a decision statistic $z_k^{(m)}$. A symbol estimate $\hat{m}_k$ for the kth user is then generated by selecting the largest of the M decision statistics $z_k^{(m)}$ in a selection device 26.

A number of techniques have been proposed to improve the performance of the conventional detector of FIG. 1. One such proposed technique utilizes a reverse link pilot signal transmitted by each mobile user to aid in channel estimation. However, the use of such a signal would require changes to the IS-95 standard and hence to system hardware and software configured to operate in accordance with that standard. Another proposed technique utilizes an adaptive antenna array (AAA) receiver in which antenna weights are adaptively adjusted to account for MAI. However, this approach requires significant additional computational power to adaptively adjust the antenna weights. These and other techniques have therefore been unable to significantly increase system capacity, or equivalently, reduce signal-to-interference requirements, without introducing inefficiency or requiring substantial changes in the IS-95 standard.

SUMMARY OF THE INVENTION

We have discovered that detection of orthogonally-modulated signals can be considerably improved through the use of coherent channel estimates. Advantageously, the use of coherent channel estimates in accordance with the invention allows the implementation of performance improvement techniques such as maximal ratio combining (MRC), coherent detection and interference cancellation. In an illustrative embodiment, a matched filter bank provides a set of matched filter outputs for different combinations of data symbols, received signal multipath components, and base station receive antennas. The matched filter outputs are processed in a coherent channel estimator to generate a set of coherent channel estimates. The channel estimates may be generated directly from the matched filter outputs, or may be generated by processing the matched filter outputs using a decorrelating detector approach which involves multiplication by a decorrelation matrix.

An exemplary coherent channel estimator in accordance with the invention receives a set of matched filter outputs. These outputs for a kth user, k=1, 2, ... K, are represented as $y^{(m)}_{k,l,a}$, where a=1, 2, ... A specifies one of A receive antennas, l=1, 2, ... L specifies one of L multipath components of the kth user, and m=1, 2, ... M specifies one of M data symbols. The coherent channel estimator for antenna a includes a symbol-driven selection device associated with the kth user that receives as its input ML matched filter outputs $y^{(m)}_{k,l,a}$ for the kth user. The selection device is operative to select, for the kth user, L of the ML matched filter outputs which correspond to an estimate of a selected symbol for that user from a previous symbol interval.

The coherent channel estimator further includes L buffers for the kth user, with each of the buffers having a width W corresponding to a designated number of symbol intervals, for storing the L selected matched filter outputs as received from the selection device. The L buffers and a selection device may be provided for each of K users, in conjunction with L summing devices for each of the K users. Each of the L summing devices for a given user is operative to sum the matched filter outputs from a corresponding one of the buffers, to form a vector. The coherent channel estimator also includes a multiplier operative to multiply the vector by a designated quantity to obtain the corresponding channel estimates. This designated quantity may include, for example, a factor $1/(W\sqrt{E_s})$, where W is the width of the buffer and $E_s$ is the symbol energy. In an embodiment which utilizes the above-noted decorrelating detector approach, the designated quantity may also include a decorrelation matrix generated for the vector.

In accordance with another aspect of the invention, the above-noted interference cancellation may be implemented for a kth user as a multistage process. A first stage of the process generates preliminary symbol estimates for each of a plurality of interfering users j, j=1, 2, ... K, j≠k, of the system. A second stage reconstructs received signals for the interfering users, utilizing (i) the preliminary symbol estimates for those users, (ii) information regarding spreading-symbol codes and delays associated with those users, and (iii) the channel estimates.

The second stage also subtracts, from a stored copy of the received signal, multiaccess interference attributable to the interfering users, so as to form an enhanced received signal for the kth user. A third stage processes the enhanced received signal to generate a symbol estimate for the kth user. These symbol estimates can be used in place of the preliminary symbol estimates in the second stage to drive another round of interference cancellation. Furthermore, such iterations can continue indefinitely using increasingly refined symbol estimates. In order to reduce detection complexity, regardless of the number of iterations, these interference cancellation techniques may be provided for only a subset of a plurality of users of the system. Moreover, interference cancellation in accordance with the invention may make use of coherent channel estimates generated in the manner described above, or coherent channel estimates generated in any other suitable manner.

A signal detector in accordance with the invention can provide significantly improved performance relative to a conventional noncoherent signal detector. For example, generating coherent multipath channel estimates for each of a number of receive antennas permits the use of MRC, which can improve performance by several decibels relative to the conventional detector. In addition, the relative gains associated with MRC increase as the number of antennas increase. Further improvement could be provided by utilizing coherent detection. In an IS-95 system with 64-ary orthogonal modulation used in the IS-95 system, the gain from use of noncoherent detection will be about 1.5 dB. Still further gains can be obtained through the use of the above-described interference cancellation.

DETAILED DESCRIPTION

The present invention will be illustrated below in conjunction with an exemplary IS-95 code division multiple access (CDMA) wireless communication system. It should be understood, however, that the invention is not limited to use with this particular system, but is instead more generally applicable to any multiaccess communication system with orthogonally-modulated data signals in which it is desirable to provide improved signal detection. For example, although the techniques are illustrated with reference to the IS-95 CDMA cellular and personal communications service (PCS) systems, it will be apparent to those skilled in the art that the techniques are also applicable to other CDMA systems, as well as to other types of wideband and narrowband wireless systems. The terms "uplink" or "reverse link" as used herein refer generally to a mobile-to-base communication link in a wireless system.

In accordance with the invention, the performance of a CDMA signal detector is considerably improved through the use of coherent channel estimates. An illustrative embodiment of the invention processes received CDMA signals to obtain coherent channel estimates, and utilizes these estimates to perform one or more of coherent maximal ratio combining (MRC), coherent detection and interference cancellation. The coherent channel estimates are used in the illustrative embodiment to provide MRC. The MRC in effect weights the receive antenna outputs so as to form "beams" which collect energy from each of the users' various multipath components. These "beams" are non-adaptive, i.e., deterministic, in the sense that they are a deterministic function of the coherent channel estimates. The coherent channel estimates may also be used to implement coherent detection in conjunction with MRC. Since the MRC "beamforming" for any desired user's given multipath component may be done without regard to interfering users, there may be some multiaccess interference (MAI). As will be described in detail below, this MAI may be removed by an interference canceller which makes use of the coherent channel estimates.

Notation

The following notation will be used in the description of the illustrative embodiments of the invention. Consider the reverse link of an IS-95 system where K users transmit asynchronously and are received at an A-antenna base station via a multipath channel. It is assumed without limitation that power control is perfect and that the received signal at each antenna consists of L independently-faded resolvable multipath components of each user's transmitted signal. Let the downconverted received signal $r_a(t)$ from the ath antenna, a=1, 2, . . . A, be:

$$r_a(t) = \sum_{k=1}^{K} \sum_{l=1}^{L} \sqrt{P} c_{k,l,a} s_k^{(m_k)}(t - \tau_{k,l}) + n_a(t), \quad (1)$$

where P is the symbol power. The symbol energy is defined as $E_s \equiv PT$ where T is the symbol interval.

The notation $c_{k,l,a}$ in (1) denotes the complex channel coefficient for the lth multipath component of the kth user at the ath antenna. These coefficients are independent zero-mean complex Gaussian random variables. If the Rayleigh fading is sufficiently slow and given that power control is assumed to be perfect, then the channel coefficients are normalized such that the total received energy for a given user k during each symbol interval is $$\sum_{l=1}^{L} \sum_{a=1}^{A} \|c_{k,l,a}\|^2 = A.$$

Otherwise, if the Rayleigh fading is too fast, power control can only account for the slow shadow fading; in this case, the variance of the channel coefficients are set such that $$E\left[\sum_{l=1}^{L} \sum_{a=1}^{A} \|c_{k,l,a}\|^2\right] = A.$$

We will use the following vector notation to group together these channel coefficients:

$$c_{k,a} \equiv [c_{k,1,a}\ c_{k,2,a}\ \ldots\ c_{k,L,a}]^T \quad (L \times 1)$$

$$c_a \equiv [c_{1,a}^T\ c_{2,a}^T\ \ldots\ c_{K,a}^T]^T \quad (KL \times 1)$$

$$c \equiv [c_1^T\ c_2^T\ \ldots\ c_A^T]^T \quad (KLA \times 1)$$

The notation $s_k^{(m_k)}(t)$ in (1) denotes the complex data signal for the kth user, modulated using the Walsh sequence $m_k \in \{1 \ldots M\}$ and spread using a long code assigned to user k and a complex short code. We call this long code the "spreading-data" code. In an IS-95 system, the data modulation is order M=64. The half-chip delay in the Q-channel is implicit in the data signal, but for simplicity, we assume that $s({}^k_{(m}{}^k{}_)}(t)$ is non-zero only over the symbol interval [0,T). The signal is normalized to have power T. Hence, due to the orthogonal data modulation, $$\int_0^T s_k^{(m)*}(t)s_k^{(n)}(t)dt = \begin{cases} T, & m=n \\ 0, & m \neq n \end{cases}$$

For IS-95, the total spreading gain of the data signal is $N_c=256$. The notation $\tau_{k,l}$ in (1) denotes the delay of the lth multipath component of the kth user's signal. We assume that for a given resolvable multipath component, the delays are the same at each antenna. The notation $n_a(t)$ in (1) denotes the background noise component at the ath antenna which accounts for thermal noise and uplink interference from other sectors and cells. Its power spectral density is $N_0/2$.

Illustrative techniques for acquiring coherent channel estimates in accordance with the invention will now be described. Advantageously, each of these techniques can be implemented without the need for a reverse link pilot signal or any other alteration in the existing IS-95 standard.

Channel Estimates via Matched Filtering

Coherent channel estimates can be obtained in accordance with the invention using otherwise conventional matched filters which disregard the presence of MAI and multipath interference. If the channel is stationary over a window of W symbol intervals, a given channel estimate can be generated as a weighted average of past channel estimates. We will assume that equal weighting is used in this embodiment. Let $y_a$ be the KL-vector output for the ath antenna of a bank of filters matched to the delayed spreading-data codes over this window of W symbols (x-1, x-2, ..., x-W) and normalized by $\sqrt{T}$. The vector $y_a$ is implicitly a function of x, the current symbol interval, and will be used to derive the channel estimates during this interval. However, note that $y_a$ is derived from signals in symbols x-1, x-2, ..., x-W. This strategy will become clear in the following discussion.

Figure 2A:
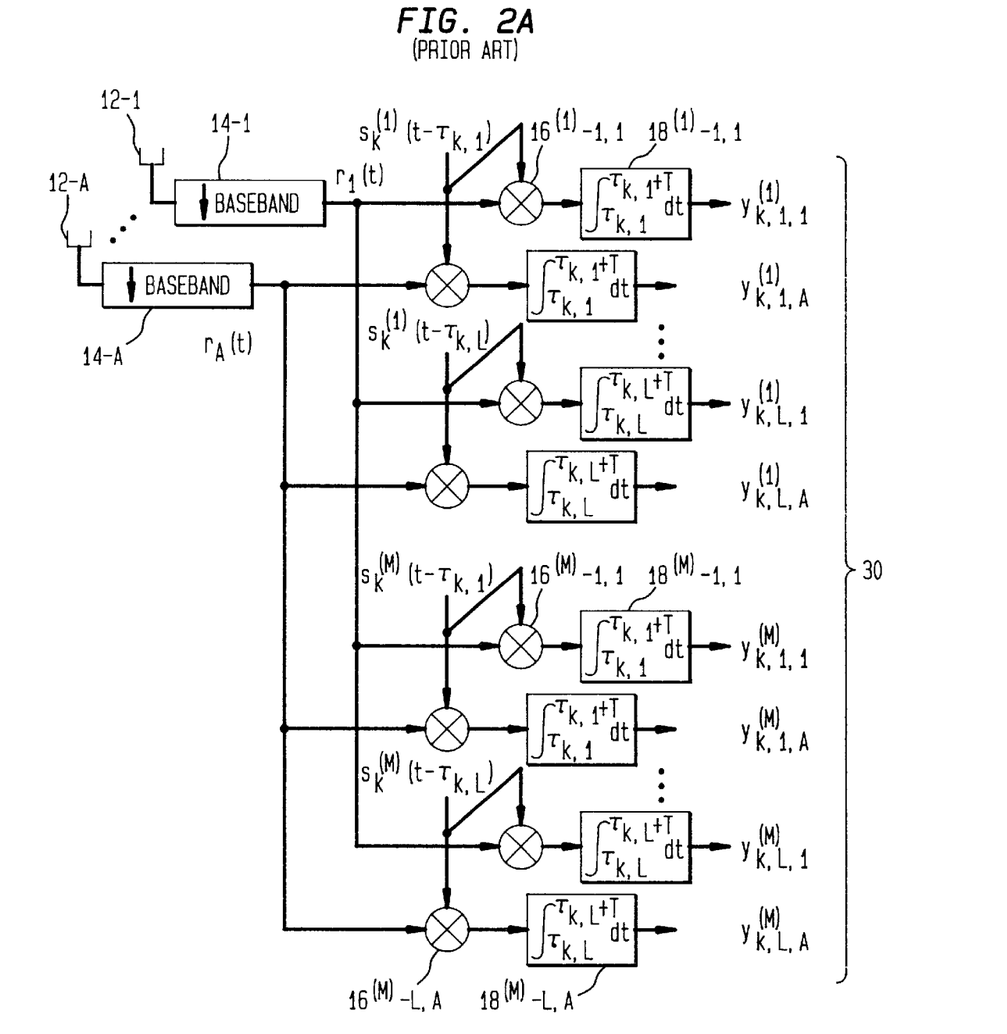
FIG. 2A illustrates the manner in which matched filter outputs are generated in the conventional noncoherent detector of FIG. 1.

FIG. 2A shows the outputs of the bank of matched filters generated for the kth user in the conventional detector of FIG. 1. Each matched filter output in the set of matched filter outputs 30 for the kth user may be written as $y^{(m)}_{k,l,a}$, where a specifies one of the A antennas, l=1, 2, ... L specifies one of the multipath components of the kth user, and m=1, 2, ... M specifies one of M possible data symbols. The notation $y_a$ is used herein as a shorthand vector notation for the KL-vector output for the ath antenna. Based on the above-noted stationary window of W symbol intervals, the equal weighting assumption and normalization by $\sqrt{T}$, $y_a$ can be written as $$y_a = W\sqrt{TP}Rc_a + n_a \quad (2)$$

where R is the KL-square correlation matrix with the $(k_1L+l_1, k_2L+l_2)$th term $$R_{(k_1L+l_1, k_2L+l_2)} = \frac{1}{WT}\int_0^{WT}\sum_{w=1}^{W} s_{k_1}^{(m_x-w)*}(t-\tau_{k_1,l_1}-wT)\sum_{w=1}^{W} s_{k_2}^{(n_x-w)}(t-\tau_{k_2,l_2}-wT)dt$$

(the data symbols m and n for users $k_1$ and $k_2$, respectively, are obtained from the previous W symbol intervals x-1, x-2, ..., x-W) such that the diagonal terms are unity, $c_a$ is the KL-vector of channel coefficients with the (kL+l)th term $c_{k,l,a}$, and $n_a$ is a KL-complex zero-mean Gaussian random vector whose real and imaginary parts, $n^R$ and $n^I$, respectively (the R and I superscripts respectively denote the real and imaginary parts of vectors and matrices), are distributed as $$\begin{bmatrix} n^R \\ n^I \end{bmatrix} \sim \eta\left(\begin{bmatrix} 0_{KL} \\ 0_{KL} \end{bmatrix}, \frac{WN_0}{2}\begin{bmatrix} R^R & -R^I \\ R^I & R^R \end{bmatrix}\right)$$

where $0_{KL}$ is a KL-vector of zeros. The estimate $\hat{c}_{k,l,a}$ for symbol period x using the conventional matched filter is the (kL+l)th component of $y_a$ normalized by $W\sqrt{E_s} = W\sqrt{TP}$:

$$\hat{c}_{k,l,a} = \frac{1}{W\sqrt{E_s}} y_{a(kL+1)} = \frac{1}{W\sqrt{E_s T}}\int_0^{WT} r_p(t)\sum_{w=1}^{W} s_k^{(m_x-w)*}(t-\tau_{k,l}-wT)dt,$$

and the KL channel vector estimate is $$\hat{c}_a = \frac{1}{W\sqrt{E_s}} y_a = Rc_a + \frac{1}{W\sqrt{E_s}} n_a = c_a + (R-I)c_a + \frac{1}{W\sqrt{E_s}} n_a. \quad (3)$$

The last expression in (3) shows the estimate written in terms of the actual channel vector, the MAI interference, and the background noise. The expected value of the off-diagonal elements of R are zero, and the background noise vector is a zero-mean complex Gaussian random vector with distribution $$\frac{1}{W\sqrt{E_s}}\begin{bmatrix} n_a^R \\ n_a^I \end{bmatrix} \sim \eta\left(\begin{bmatrix} 0_{KL} \\ 0_{KL} \end{bmatrix}, \frac{N_0}{2WE}\begin{bmatrix} R^R & -R^I \\ R^I & R^R \end{bmatrix}\right).$$

Hence the channel vector estimate is unbiased. Modeling the MAI as additive white Gaussian noise, the estimate $\hat{c}_{k,l,a}$ can be shown to be a complex Gaussian random variable with mean $c_{k,l,a}$ and variance (for the real and imaginary components)

$$\text{Var}(\hat{c}_{k,l,a}) = \frac{K-1/L}{2WN_c} + \frac{1}{2W(E_s/N_0)} \quad (4)$$

where the first term corresponds to the MAI and assumes asynchronous MAI with band-limited chip waveforms, and the second term corresponds to the background noise.

Figure 2B:
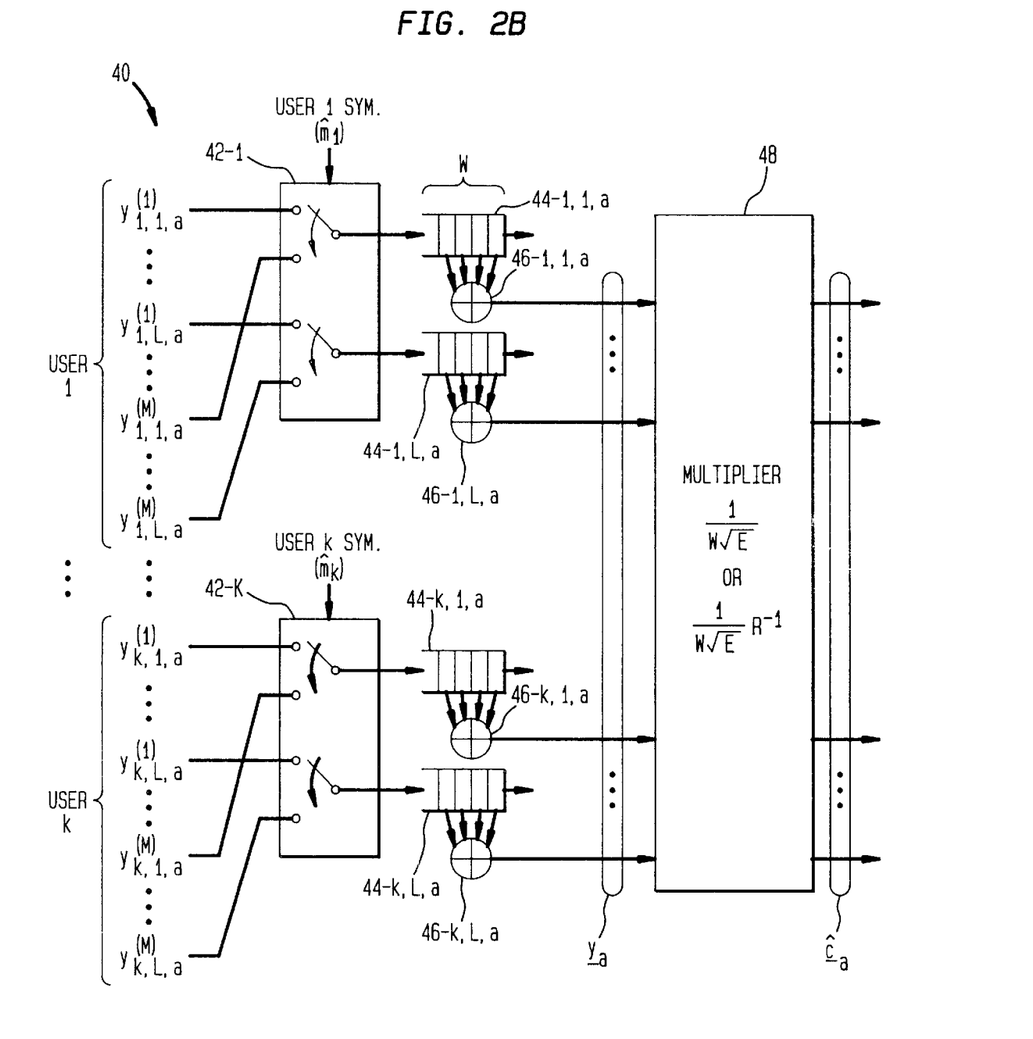
FIG. 2B illustrates how the conventional matched filter outputs obtained in FIG. 2A can be processed to yield coherent channel estimates in accordance with the invention.

FIG. 2B shows a coherent channel estimator 40 in accordance with the invention. The channel estimator 40 may be used to implement the above-described technique for generating coherent channel estimates from the set of matched filter outputs 30 in FIG. 2A. The matched filter outputs $y^{(m)}_{k,l,a}$ for symbol x are collected for each of the K users as shown. The ML matched filter outputs for a given user k are applied to a corresponding symbol-driven selection device 42-k. A given selection device 42-k selects the L matched filter outputs for the kth user which correspond to the estimate $\hat{m}_k$ of the selected symbol for that user. The L selected matched filter outputs from the given selection device 42-k are passed into a corresponding buffer 44-k,l,a which has a width W. For example, if we choose symbol 16 for user 1 (i.e., $\hat{m}_1$=16), we would pass the L matched filter outputs $y^{(16)}_{1,1,a} \cdots y^{(16)}_{1,L,a}$ to the buffer 44-1,1,a. The buffer 44-k,l,a is a first-in, first-out buffer which stores the last W matched filter outputs.

The last W matched filter outputs in a given buffer 44-k,l,a are summed in a corresponding summing device 46-k,l,a. The outputs of all of the summing devices 46-k,l,a together form the KL-vector $y_a$ which is given by equation (2) above. This vector is then applied to a multiplication device 48 in which it may be multiplied by $1/(W\sqrt{E_s})$ as in equation (3) above to yield the coherent channel estimate vector $\hat{c}_a$. As will be shown below, the channel estimator 40 of FIG. 2A may also be used in a decorrelating detector approach by altering the multiplication in the multiplication device 48.

Channel Estimates via Decorrelating Detectors

An alternative technique for generating coherent channel estimates in accordance with the invention makes use of decorrelating detectors. A channel estimate generated using a decorrelating detector approach, unlike an estimate acquired directly from a matched filter as described previously, will ideally not be affected by MAI. Returning to equation (2) which gives the matched filter bank output KL-vector $y_a$, notice that by premultiplying the vector $y_a$ by the KL-square decorrelation matrix $R^{-1}$, the effects of the MAI due to the off-diagonal terms of R are eliminated and the components of $y_a$ are decorrelated from one another. Normalizing by the window size W and symbol energy $E_s$, the channel vector estimate, written as $$\hat{c}_a = \frac{1}{W\sqrt{E_s}} R^{-1} y_a = c_a + \frac{1}{W\sqrt{E_s}} R^{-1} n_a, \quad (5)$$

is simply the actual channel vector plus the background noise which is enhanced due to the fact that the diagonal terms of $R^{-1}$ are greater than unity. In general, if the off-diagonal cross correlation terms in the correlation matrix R are sufficiently small, then the effects of the enhanced background noise in (4) are less than those of the combined MAI and background noise effects (3). In general, the cross correlation terms are sufficiently small in the IS-95 uplink channel for this to be the case, and consequently, the decorrelator's channel estimates have a smaller variance. The channel estimate $\hat{c}_{k,l,a}$ can be shown to be a complex Gaussian random variable with mean $c_{k,l,a}$ and variance $$\text{Var}(\hat{c}_{k,l,a}) = \frac{1}{2W(E_s/N_0)} \left[(R^R)^{-1}\right]_{(kL+l,kL+l)}. \quad (6)$$

The coherent channel estimator of FIG. 2B may be used to generate channel estimates using the above-described decorrelating detectors approach. This can be accomplished by configuring the multiplication device 48 to provide multiplication by the decorrelation matrix $R^{-1}$ in addition to multiplication by $1/(W\sqrt{E_s})$.

In terms of implementation, the decorrelating detector approach generally requires that the correlation matrix R and its inverse be computed every W symbols during which the channel changes appreciably. This matrix requires knowledge of all the user spreading codes, symbols, and multipath delays during this window. However, it does not require prior knowledge of the channel vector. It has been shown that approximations to the matrix inverse, which are significantly easier to calculate than the actual inverse, can be used in place of the matrix inverse with very little performance degradation. See, for example, C.-L. I, C. A. Webb III, H. C. Huang, S. ten Brink, S. Nanda, and R. D. Gitlin, "IS-95 Enhancements for Multimedia Services," Bell Labs Technical Journal, Vol. 1, No. 2, Autumn 1996, pp. 60–87, and N. Mandayam and S. Verdú, "Analysis of an Approximate Decorrelating Detector," Wireless Personal Communications, which are incorporated by reference herein.

Coherent channel estimates obtained in the manner described above can be used to provide maximal ratio combining in place of conventional selection diversity and equal gain combining, coherent detection in place of conventional noncoherent detection, and interference cancellation. Each of these techniques will be described in detail below.

Maximal Ratio Combining

Maximal ratio combining (MRC) in accordance with the invention weights each of the matched filter outputs with the complex conjugate of the corresponding coherent channel estimate. For a given symbol m and user k, the real parts of the resulting L complex values are summed to create the decision statistic $z_k^{(m)}$. The real part of the weighted matched filter output for the kth user's lth multipath component with respect to symbol m at antenna a is $$z_{k,l,a}^{(m)} \equiv \text{Re}\left[\frac{\hat{c}_{k,l,a}^*}{\sqrt{T}} \int_{\tau_{k,l}}^{\tau_{k,l}+T} r_a(t) s_k^{(m)*}(t - \tau_{k,l}) dt\right], \quad (7)$$

and the decision statistic is defined as $$z_k^{(m)} \equiv \sum_{l=1}^{L} \sum_{a=1}^{A} z_{k,l,a}^{(m)}. \quad (8)$$

Figure 3:
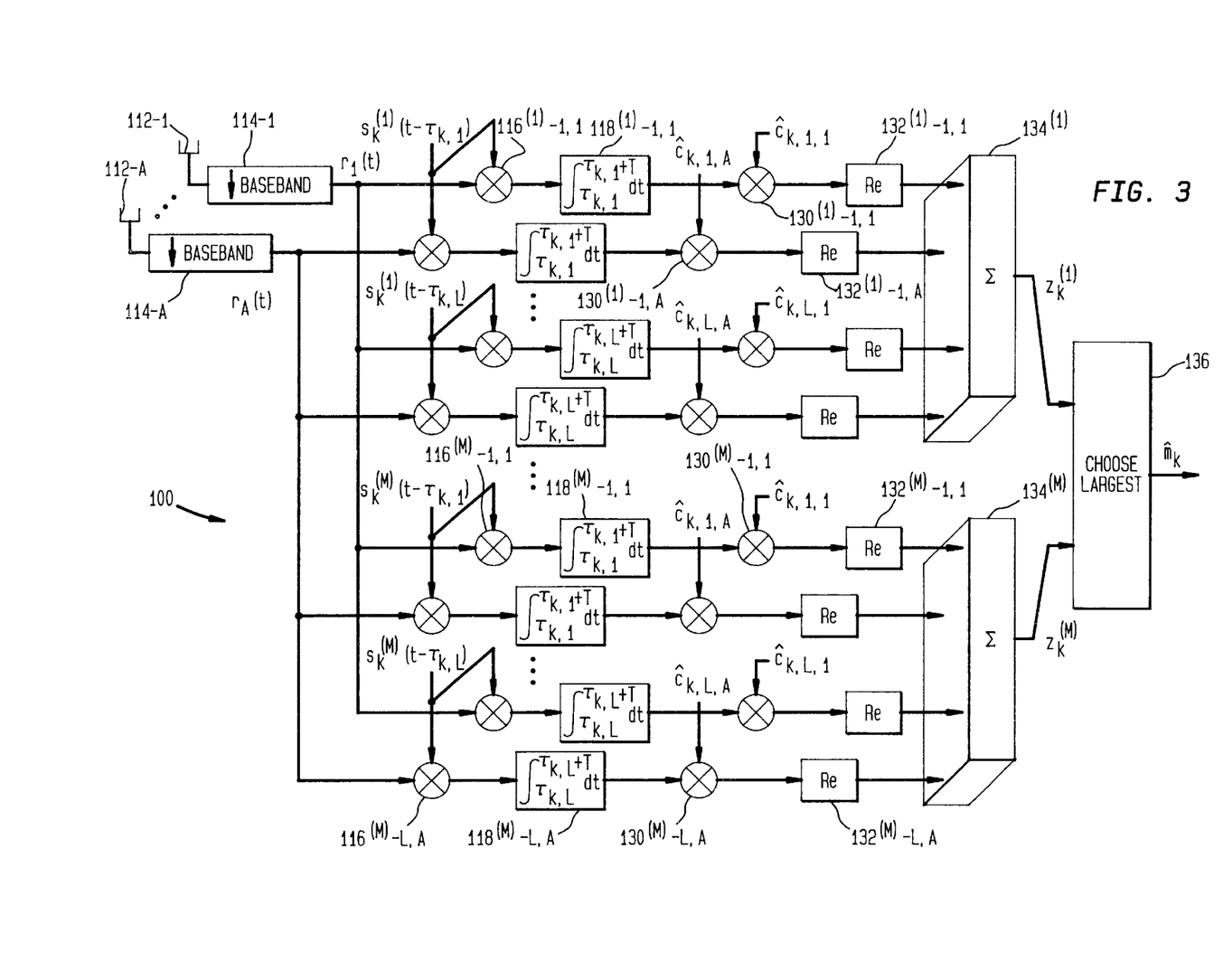
FIG. 3 is a block diagram of a CDMA signal detector which utilizes coherent channel estimates generated in accordance with the invention.

FIG. 3 shows a base station detector 100 in accordance with the invention that incorporates the above-described maximal ratio combining for detecting an uplink CDMA signal transmitted by the kth user. The detector 100 includes A receive antennas 112-a, a=1, 2, . . . A. Each of the antennas 112-a is coupled to a corresponding downconverter 114-a. The downconverted baseband received signal from the ath antenna is designated $r_a(t)$. This signal is correlated with M data signals $s_k^{(m)}(t-\tau_{k,l})$. Each correlator in the detector 100 includes a multiplier 116$^{(m)}$-l, a and a matched filter 118$^{(m)}$-l, a both of which operate in substantially the same manner as the corresponding elements in the conventional detector of FIG. 1. Each correlator further includes a multiplier 130$^{(m)}$-l, a which correlates the corresponding matched filter output with a channel estimate generated in the manner described in conjunction with FIG. 2B. For a given symbol m and user k, elements 132$^{(m)}$-l, a take the real parts of the L complex values from the corresponding multipliers 130$^{(m)}$-l, a. These real parts of the L complex values are summed in a combiner 134$^{(m)}$ to create the decision statistic $z_k^{(m)}$. A symbol estimate $\hat{m}_k$ for the kth user is then generated by selecting the largest of the M decision statistics $z_k^{(m)}$ in a selection device 136.

The gains associated with an MRC(LA) (i.e., MRC of order LA) detector such as that shown in FIG. 3 are significant compared to the conventional detector of FIG. 1 which uses selection diversity of order L (SD(L)) followed by equal gain combining of order L (EGC(L)). The signal-to-noise ratio (SNR) of an MRC(LA) system with perfect channel knowledge and an SD(A)EGC(L) system are, respectively, $$\sum_{l=1}^{L}\sum_{a=1}^{A}\|c_{k,l,a}\|^2/\sigma^2 \quad \text{and} \quad \left[\sum_{l=1}^{L}(\|\tilde{c}_{k,l}\|)\right]^2 / (L\sigma^2),$$

where $\sigma^2$ is the noise variance and $\tilde{c}_{k,l}$ is the term with the lth largest magnitude among the KL channel parameters. Based on simulation results, it has been determined that the MRC(LA) system provides gains of approximately 0.7 dB, 2.6 dB, and 3.9 dB over the conventional combining method for, respectively, A=2, 4, and 6 antennas. Note that for every gain of 3 dB, the capacity of the system doubles. In practice, the actual gains achieved using MRC will be somewhat less due to channel parameter mismatch.

Coherent Detection

In the detector of FIG. 3, which utilizes MRC, the symbol estimate $\hat{m}_k$ for the kth user corresponds to the largest MRC output $z_k^{(1)} \ldots z_k^{(M)}$ given by (8). Note that when MRC is performed, noncoherent detection can still be performed by comparing the energies of the MRC outputs. However, the use of coherent detection in conjunction with MRC can provide some additional performance improvement. We will now determine the symbol error rate (SER) as a function of SNR for coherent detection of M-ary orthogonal modulation with M=64 in the detector of FIG. 3. A closed form expression for the SER of the conventional noncoherent detector is given for L=1 in J. G. Proakis, "Digital Communications," $2^{nd}$ ed., McGraw Hill, New York, 1989. The SER for coherent detection in the detector of FIG. 3 is given by a similar expression $$1 - \int_{-\infty}^{+\infty} [Pr(z_1^{(2)} < z|z)]^{M-1} p_{z_1^{(1)}}(z|\mu)dz$$

where $z_1^{(1)} \sim \eta(\mu,\sigma^2)$ and $z_1^{(2)} \sim \eta(0,\sigma^2)$ and where the SNR is defined as $\mu^2/\sigma^2$. There is about a 1.5 dB gain in performance for L=4 when using coherent detection in the detector of FIG. 3 relative to the conventional noncoherent detector of FIG. 1.

We will now compute the uncoded bit error rate (BER) for an MRC(LA) coherent detector as a function of actual and estimated channel vectors. Suppose that user 1 is the desired user and that the symbol m=1 was sent. Then the decision statistic $z_1^{(1)}$ for user 1, symbol 1 has is a complex Gaussian random variable with mean $$\mu \equiv \sqrt{E_s}\sum_{a=1}^{A} \text{Re}(\hat{c}_{1,a}^H c_{1,a}) \qquad (9)$$

where $c_{k,a} \equiv [c_{k,1,a} \ldots c_{k,L,a}]^T$ is the vector of channel coefficients for user k, antenna a, and $\hat{c}_{k,a} \equiv [\hat{c}_{k,1,a} \ldots \hat{c}_{k,L,a}]^T$ is the corresponding vector of channel estimates. The real and imaginary components of $z_1^{(1)}$ are independent with variance $$\sigma^2 \equiv \sum_{a=1}^{A} \|\hat{c}_{1,a}\|^2 \left[ \frac{E_s}{2N_c}(K-1/L)\left[\frac{\|c\|^2}{KA}\right] + \frac{N_0}{2} \right]. \qquad (10)$$

We denote this complex Gaussian distribution as $z_1^{(1)} \sim \eta^{complex}(\mu,\sigma^2)$. The decision statistic $z_1^{(m)}$ for user 1, symbol m≠1 is a zero mean complex Gaussian random variable with the same variance: $z_1^{(m)} \sim \eta^{complex}(0,\sigma^2)$. The symbol error probability, conditioned on the channel vector and its estimates, is $$P_s(c,\hat{c}) = 1 - Pr(\text{correct symbol}|c,\hat{c}) \qquad (11)$$

$$= 1 - \int_{-\infty}^{+\infty} [Pr(z_1^{(2)} < z|z,c,\hat{c})]^{M-1} p_{z_1^{(1)}}(z|c,\hat{c})dz$$

$$= 1 - \int_{-\infty}^{+\infty} [1 - Q(z/\sigma)]^{M-1} \frac{1}{\sqrt{2\pi}} \exp\left[\frac{-1}{2\sigma^2}(z-\mu)^2\right]dz$$

The uncoded bit error probability for an M-ary modulation scheme given the symbol error rate is $$P_b(c) = \frac{M/2}{M-1} P_s(c).$$

Note that this expression is conditioned on the values of $s^2$ and $\sigma^2$ which depend on the channel parameters. Hence, the conditional bit error probability is $$P_b(c,\hat{c}) = \qquad (12)$$

$$\frac{M/2}{M-1}\left\{ 1 - \int_{-\infty}^{+\infty}[1-Q(z/\sigma)]^{M-1}\frac{1}{\sqrt{2\pi}}\exp\left[\frac{-1}{2\sigma^2}(z-\mu)^2\right]dz \right\}.$$

Note that unlike the noncoherent bit error probability, the multipath order L in the coherent bit error probability in (12) appears only implicitly in the signal means $\mu$ (9) and variance $\sigma^2$ (10). Note also that the coherent bit error probability in (12) depends on both the channel coefficients and their estimates while the noncoherent bit error probability is independent of the estimates since they are not required for noncoherent detection.

Interference Cancellation

It is well known that CDMA systems are interference limited, meaning that their performance, rather than being limited by thermal noise, is limited by multiaccess interference (MAI) from CDMA users which are non-orthogonal to the desired user. The IS-95 standard is designed so that the correlation between any two users is, on average, low, and conventional IS-95 base station detectors such as that shown in FIG. 1 do nothing to account for the presence of MAI. However, capacity can be potentially increased by several times if the interference is eliminated or suppressed. Interference cancellation is a nonlinear multiuser detection technique in which baseband MAI is reconstructed using preliminary symbol estimates and subtracted from the received signal prior to a second stage of symbol estimation.

Figure 4:
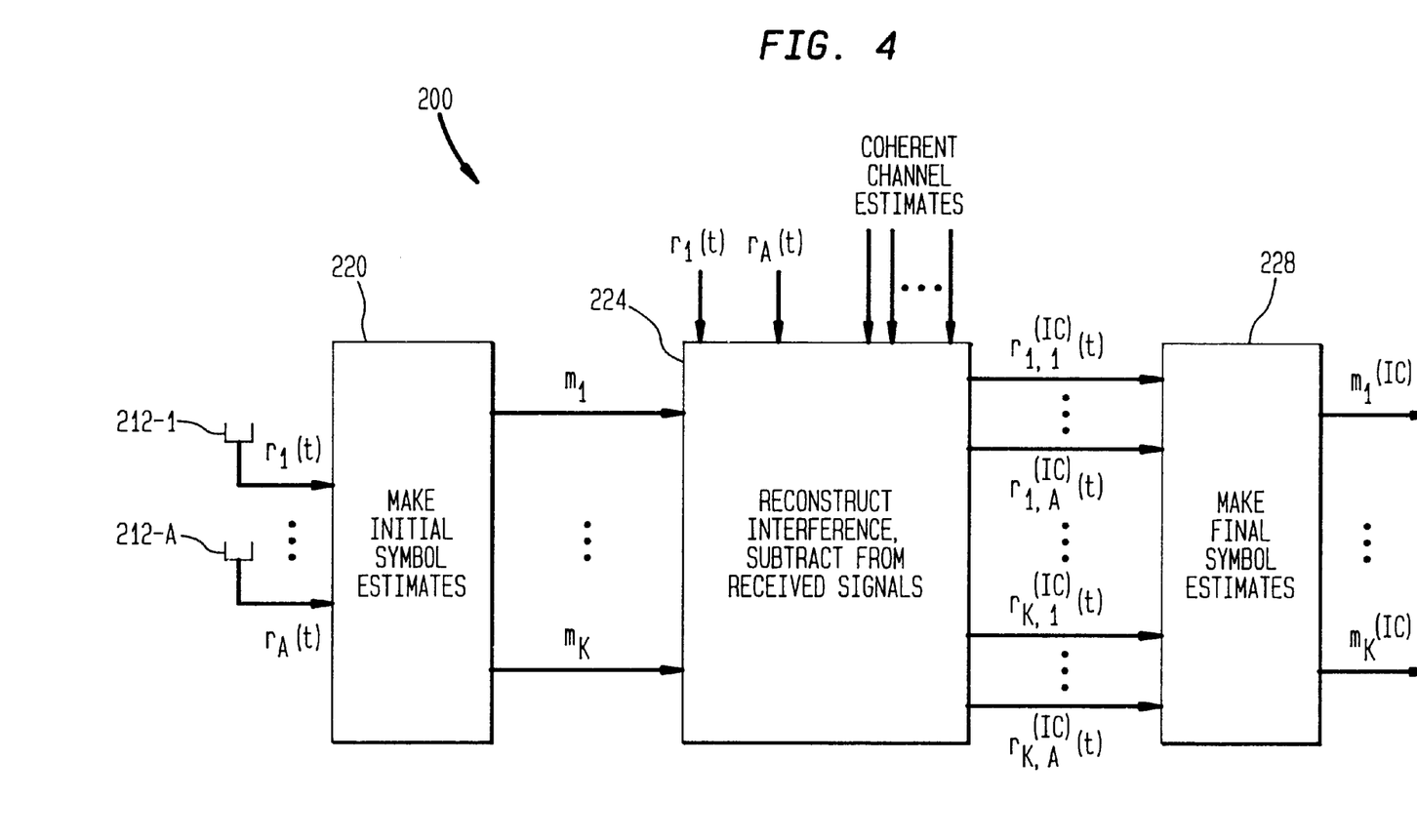
FIG. 4 is a block diagram of an interference cancellation detector which utilizes coherent channel estimates generated in accordance with the invention.

FIG. 4 shows a block diagram of an interference cancellation receiver 200 in accordance with the invention. This receiver 200 includes A antennas 212-a, a=1, 2, ... A, and has three stages, designated 220, 224 and 228. The first stage 220 receives downconverted baseband CDMA signals $r_a(t)$, and makes preliminary symbol estimates for all users with either a conventional detector such as detector 10 of FIG. 1 or an enhanced MRC detector such as detector 100 of FIG. 3. The second stage 224 uses (i) the preliminary symbol estimates from the first stage 220, (ii) knowledge of the users' spreading-symbol codes and delays, and (iii) channel estimates generated as described in conjunction with FIG. 2B, to reconstruct the baseband received signals for each of the users. The second stage 224 also subtracts the MAI with respect to a desired user k from the received signals $r_1(t) \ldots r_A(t)$ to form the following enhanced received signals:

$$r_{k,a}^{(IC)}(t) \equiv r_k(t) - \sum_{\substack{j=1 \\ j \neq k}}^{K} \sum_{l=1}^{L} \sqrt{P} \hat{c}_{j,l,a} s_j^{(\hat{m}_j)}(t - \tau_{j,l}) \quad a = 1 \cdots A.$$

Note that the multipath interference with respect to a given user k can also be removed. We will not describe this option in detail because its relative gains will generally be negligible unless the number of users K is very small. Ideally, if the preliminary symbol estimates and the channel estimates are perfect, there will be no MAI in the enhanced received signals. However, this will generally not be the case in practice. In the third stage 228, the enhanced received signals are processed to generate the final symbol estimates $\hat{m}_k^{(IC)}$ for the K users. The above-described interference cancellation procedure can be continued for multiple iterations by repeating stages 224 and 228 indefinitely, using increasingly refined symbol estimates. For example, a set of final symbol estimates from stage 228 can be used in place of the preliminary symbol estimates in the second stage 224 to drive another round of interference cancellation. Performance gains due to such repeated iterations will typically diminish after the first two or three iterations.

To reduce the complexity, regardless of the number of iterations, interference cancellation can be performed on a subset of the uplink users. For example, in the case where a single high speed data user transmits on half of the total uplink data channels, interference cancellation can be implemented just for this user so that its power requirements can be lowered, resulting in less interference to neighboring cells. Either preliminary symbol estimates or enhanced symbol estimates can be used for the remaining data channels, depending on the amount of added complexity permitted in the application.

The object of interference cancellation in the above-described illustrative embodiment of the invention is to reduce the variance of the decision statistics $z_1^{(1)} \ldots z_1^{(64)}$ at the outputs of the combiners $134^{(m)}$ in the FIG. 3 detector. Suppose that a fraction $\beta \in [0,1]$ of the total interferers are removed by the interference cancellation receiver 200 and that for this fraction of users, their average preliminary symbol error rate is q. Then, from (10) the variance of the decision statistics $z_1^{(1)} \ldots z_1^{(64)}$ at the outputs of the combiners is $$\sigma^2 \equiv \sum_{a=1}^{A} \|\hat{c}_{1,a}\|^2 \quad (13)$$

$$\left[ \frac{E_s(K-1/L)\|c - \hat{c}\|^2}{2N_c KA} \beta(1-q) + \frac{E_s(K-1/L)\|c\|^2}{2N_c KA} 2\beta q + \frac{E_s(K-1/L)\|c\|^2}{2N_c KA} (1-\beta) + \frac{N_0}{2} \right]$$

where the first term in the brackets corresponds to the MAI which has been properly cancelled (with probability 1-q), the second term corresponds to the MAI whose preliminary symbol estimates were wrong (with probability q), the third term corresponds to the remaining MAI which was not cancelled, and the fourth term corresponds to the background noise. Assuming symbol 1 was sent for user 1, the mean $\mu$ of $z_1^{(1)}$ is still given by (9) since the effects of the MAI are only in the variance. Hence the bit error rate of an MRC(LA) coherent detector conditioned on the channel and channel estimates and using interference cancellation is given by equation (12), $\mu$ and $\sigma^2$ given respectively by (9) and (13).

Interference cancellation in accordance with the invention can also be implemented as a front-end add-on for an otherwise conventional base station receiver. Such an add-on could be placed between the antenna baseband converters and the bank of matched filters. It would acquire coherent channel estimates, obtain tentative symbol estimates for the users, reconstruct the MAI, and have as its output K sets of A enhanced received signals. In order to compute the bit error rate of an otherwise conventional receiver with this type of interference cancellation, we derive the statistics of the equal gain combiner outputs $z_1^{(1)} \ldots z_1^{(64)}$. The variances are equal and are given by $$\sigma^2 \equiv \frac{E_s(K-1/L)\|c - \hat{c}\|^2}{2N_c KA} \beta(1-q) + \frac{E_s(K-1/L)\|c\|^2}{2N_c KA} 2\beta q + \frac{E_s(K-1/L)\|c\|^2}{2N_c KA} (1-\beta) + \frac{N_0}{2}, \quad (14)$$

and the noncentrality parameter $s^2$ is unaffected by the interference cancellation.

Note that interference cancellation can also be used to obtain enhanced channel estimates. Performance analyses indicate that the channel estimates obtained using interference cancellation are of comparable quality but slightly inferior to those obtained using the above-described decorrelator approach. Similarly, the decorrelator approach can be used in place of interference cancellation for symbol detection. However, its implementation complexity would be more than that of the interference cancellation (a KL×KL matrix inversion can be applied to the uncombined rake outputs at each of the A antennas or a K×K matrix inversion can be applied to the combined rake outputs), and the performance will most likely be inferior to that of interference cancellation.

CONCLUSION

The present invention provides techniques for enhancing base station receiver performance in an IS-95 system or other type of wireless system. These techniques, i.e., maximal ratio combining, coherent detection, and interference cancellation, have the potential of increasing uplink capacity in a wireless system by several fold. As was described in detail above, the techniques make use coherent channel estimates which can be acquired using, for example, matched filters or multiuser decorrelating detectors. Moreover, these enhancements have the desirable attribute of flexibility and can be implemented on a user-by-user basis. In other words, the enhanced receiver techniques can be applied to a subset of the active users while the others are detected using conventional techniques.

By way of example, the invention may be used to lower the SNR requirements for some users and have their powers controlled to a lower level. Consider users near the edge of the cell but which are not in soft handoff with adjacent cells. These users would be transmitting at a relatively high power and causing significant interference to the adjacent cells. If coherent detection and interference cancellation in accordance with the invention were used for detecting these users, their powers could be significantly lowered and the resulting out-of-cell interference reduced. The invention can also be applied to high-speed data users which simultaneously transmit on several parallel data channels. By lowering their required transmit powers, the resulting coverage of any load-and-interference-based demand access (LIDA) algorithms would improve.

It should be emphasized that the coherent detection techniques illustrated and described herein are exemplary and should not be construed as limiting the present invention to any particular embodiment or group of embodiments. Alternative embodiments of the invention may utilize various types of simplification in order to reduce detection complexity. For example, a first-order approximation for the above-described decorrelating detector may be used in generating the channel estimates. These and numerous alternative embodiments within the scope of the appended claims will be readily apparent to those skilled in the art.

What is claimed is:

1. A method for use in detecting an orthogonally-modulated signal transmitted from a user to a base station in a wireless system, the method comprising the steps of:

generating coherent channel estimates from a set of matched filter outputs for at least a subset of combinations of a plurality of data symbols, a plurality of multipath components of the signal, and a plurality of receive antennas of the base station; and utilizing the coherent channel estimates to facilitate detection of the orthogonally-modulated signal.

2. The method of claim 1 wherein the step of utilizing the coherent channel estimates to facilitate detection of the signal further includes the step of utilizing the coherent channel estimates to implement maximal ratio combining (MRC) detection of the signal.

3. The method of claim 1 wherein the step of utilizing the coherent channel estimates to facilitate detection of the signal further includes the step of utilizing the coherent channel estimates to implement coherent detection of the signal.

4. The method of claim 1 wherein the step of utilizing the coherent channel estimates to facilitate detection of the signal further includes the step of utilizing the coherent channel estimates to implement interference cancellation for the signal.

5. The method of claim 1 wherein each matched filter output in the set of matched filter outputs for a kth user, k=1, 2, ... K, is represented as $y^{(m)}_{k, l, a}$, where a=1, 2, ... A specifies one of A receive antennas, l=1, 2, ... L specifies one of L multipath components of the kth user, and m=1, 2, ... M specifies one of M data symbols, and wherein the step of generating the coherent channel estimates for antenna a further includes the steps of:

applying ML matched filter outputs $y^{(m)}_{k, l, a}$ for the kth user to a symbol-driven selection device associated with that user;

selecting L of the ML matched filter outputs for the kth user which correspond to an estimate of a selected symbol for that user from a previous symbol interval; and storing the L selected matched filter outputs from the given selection in a corresponding plurality of buffers, wherein each of the buffers has a width W corresponding to a designated number of symbol intervals.

6. The method of claim 5 further including the steps of:

repeating the applying, selecting and storing steps for at least a subset of the K users;

summing the matched filter outputs from buffers of each of the K users to form a vector; and multiplying the vector by a designated quantity to obtain the corresponding channel estimates.

7. The method of claim 6 wherein the designated quantity used in the multiplying step includes a factor $1/(W\sqrt{E_s})$, where W is the width of the buffer and $E_s$ is the symbol energy.

8. The method of claim 6 wherein the designated quantity used in the multiplying step includes a decorrelation matrix for the vector.

9. The method of claim 4 wherein the step of utilizing the coherent channel estimates to implement interference cancellation for a signal of the kth user further includes the steps of:

generating preliminary symbol estimates for each of a plurality of interfering users j=1, 2, ... K, j≠k, of the system;

reconstructing received signals for the interfering users using (i) the preliminary symbol estimates for those users, (ii) information regarding at least one of spreading-symbol codes and delays associated with those users, and (iii) the channel estimates;

subtracting, from a stored copy of the received signal, multiaccess interference attributable to the interfering users, so as to form an enhanced received signal for the kth user; and processing the enhanced received signal to generate a symbol estimate for the kth user.

10. The method of claim 4 wherein the interference cancellation is implemented for only a subset of a plurality of users of the system.

11. The method of claim 9 further including the step of repeating the reconstructing, subtracting and processing steps for one or more additional iterations, with a symbol estimate generated in a given iteration used as an input to a subsequent iteration.

12. An apparatus for use in detecting an orthogonally-modulated signal transmitted from a user to a base station in a wireless system, the method comprising the steps of:

a matched filter bank providing a set of matched filter outputs for at least a subset of combinations of a plurality of data symbols, a plurality of multipath components of the signal, and a plurality of receive antennas of the base station; and a coherent channel estimator for generating coherent channel estimates from the set of matched filter outputs, wherein the coherent channel estimates are utilized to facilitate detection of the orthogonally-modulated signal.

13. The apparatus of claim 12 wherein the matched filter bank and coherent channel estimator are elements of a maximal ratio combining (MRC) detector for detecting the signal.

14. The apparatus of claim 12 wherein the matched filter bank and coherent channel estimator are elements of a coherent detector which is operative to utilize the coherent channel estimates to provide coherent detection of the signal.

15. The apparatus of claim 12 further including an interference canceller which is operative to utilize the coherent channel estimates to provide interference cancellation for the signal.

16. The apparatus of claim 12 wherein each matched filter output in the set of matched filter outputs for a kth user, k=1, 2, ... K, is represented as $y^{(m)}_{k,l,a}$, where a=1, 2, ... A specifies of A receive antennas, l=1, 2, ... L specifies one of L multipath components of the kth user, and m=1, 2, ... M specifies one of M data symbols, and wherein the coherent channel estimator for antenna a further includes:

a symbol-driven selection device associated with the kth user that receives as input ML matched filter outputs $y^m_{k,l,a}$ for the kth user, wherein the selection device is operative to select L of the ML matched filter outputs for the kth user which correspond to an estimate of a selected symbol for that user from a previous symbol interval; and a plurality of buffers, each having a width W corresponding to a designated number of symbol intervals, for storing the L selected matched filter outputs as received from the selection device.

17. The apparatus of claim 16 further including:

a symbol-driven selection device and a plurality of buffers for each of at least a subset of the K users;

a plurality of summing devices for each of the subset of the K users, each operative to sum the matched filter outputs from a corresponding one of the buffers, wherein the outputs of the summing devices for a given one of the K users form a vector; and a multiplier operative to multiply the vector by a designated quantity to obtain the corresponding channel estimates.

18. The apparatus of claim 17 wherein the designated quantity used in the multiplier includes a factor $1/(W\sqrt{E_s})$, where W is the width of the buffer and $E_s$ is the symbol energy.

19. The apparatus of claim 17 wherein the designated quantity used in the multiplier includes a decorrelation matrix for the vector.

20. The apparatus of claim 15 wherein the interference canceller for a kth user further includes:

a first stage operative to generate preliminary symbol estimates for each of a plurality of interfering users j=1, 2, ... K, j≠k, of the system;

a second stage operative to reconstruct received signals for the interfering users using (i) the preliminary symbol estimates for those users, (ii) information regarding at least one of spreading-symbol codes and delays associated with the interfering users, and (iii) the channel estimates, and further operative to subtract, from a stored copy of the received signal, multiaccess interference attributable to the interfering users, so as to form an enhanced received signal for the kth user; and a third stage operative to process the enhanced received signal to generate a symbol estimate for the kth user.

21. The apparatus of claim 15 wherein the interference canceller provides interference cancellation for only a subset of a plurality of users of the system.

22. The apparatus of claim 20 wherein the operations of the second and third stages are repeated for one or more additional iterations, with a symbol estimate generated in a given iteration used as an input to a subsequent iteration.

23. An apparatus for detecting an orthogonally-modulated signal transmitted from a user to a base station in a wireless system, the apparatus comprising:

means for generating coherent channel estimates from a set of matched filter outputs for at least a subset of combinations of a plurality of data symbols, a plurality of multipath components of the signal, and a plurality of receive antennas of the base station; and means for detecting the orthogonally-modulated signal utilizing the coherent channel estimates.

* * * * *